United States Patent
Nelson et al.

(10) Patent No.: US 12,440,798 B2
(45) Date of Patent: Oct. 14, 2025

(54) VOLATILE ORGANIC COMPOUND REDUCTION APPARATUS

(71) Applicant: MUNTERS EUROPE AKTIEBOLAG, Kista (SE)

(72) Inventors: Anders Nelson, Stockholm (SE); Patrik Zamore, Järfälla (SE)

(73) Assignee: Munters Europe Aktiebolag, Kista (SE)

( * ) Notice: Subject to any disclaimer, the term of this patent is extended or adjusted under 35 U.S.C. 154(b) by 891 days.

(21) Appl. No.: 17/770,925

(22) PCT Filed: Aug. 13, 2020

(86) PCT No.: PCT/SE2020/050783
§ 371 (c)(1),
(2) Date: Apr. 21, 2022

(87) PCT Pub. No.: WO2021/034251
PCT Pub. Date: Feb. 25, 2021

(65) Prior Publication Data
US 2022/0355239 A1   Nov. 10, 2022

(30) Foreign Application Priority Data

Aug. 21, 2019   (SE) .................................... 1950955-3

(51) Int. Cl.
*B01D 53/02* (2006.01)
*B01D 53/06* (2006.01)
*B01D 53/44* (2006.01)

(52) U.S. Cl.
CPC ............. *B01D 53/06* (2013.01); *B01D 53/44* (2013.01); *B01D 2257/708* (2013.01)

(58) Field of Classification Search
CPC ........ B01D 2253/102; B01D 2257/708; B01D 2258/06; B01D 2259/4009;
(Continued)

(56) References Cited

U.S. PATENT DOCUMENTS

| 5,702,505 A | 12/1997 | Izumi et al. |
| 8,580,010 B2 | 11/2013 | Matsuba et al. |

(Continued)

FOREIGN PATENT DOCUMENTS

| CN | 102538088 B | 4/2015 |
| CN | 105195012 A | 12/2015 |

(Continued)

OTHER PUBLICATIONS

Examination Report dated Dec. 4, 2023, in Indian Patent Application No. 202247012879.
(Continued)

*Primary Examiner* — Christopher P Jones
(74) *Attorney, Agent, or Firm* — Venable LLP

(57) ABSTRACT

The invention relates to a VOC reduction apparatus (1) comprising first and a second rotor elements (2, 3) configured to separate VOC (9) from air by adsorption and desorption; a first adsorption zone (16) configured to guide a process airflow (8) through the first rotor element (2); a first desorption zone (13) configured to guide a first regenerating airflow (18) through the first rotor element (2); a converter (36) configured to convert the VOC (9) to residual products (37). The second rotor element (3) is configured to receive the first regenerating airflow (18), after passing through the first rotor element (2), at a second adsorption zone (38). A second desorption zone (34) is configured to guide a second regenerating airflow (32) through the second rotor element (3). The converter (36) is configured to receive the second regenerating airflow (32) after the second regenerating airflow (32) has passed the second rotor element (3).

18 Claims, 4 Drawing Sheets

(58) Field of Classification Search
CPC .. B01D 2259/402; B01D 53/06; B01D 53/44; Y02A 50/20
See application file for complete search history.

(56) References Cited

U.S. PATENT DOCUMENTS

| | | | | |
|---|---|---|---|---|
| 8,984,905 | B2* | 3/2015 | Okano | F24F 3/1423 |
| | | | | 62/476 |
| 10,201,776 | B2 | 2/2019 | Kuroda et al. | |
| 2005/0150378 | A1* | 7/2005 | Dunne | B01D 53/261 |
| | | | | 95/113 |
| 2018/0154303 | A1 | 6/2018 | Giles et al. | |
| 2018/0221810 | A1* | 8/2018 | Chang | B01D 53/06 |

FOREIGN PATENT DOCUMENTS

| | | |
|---|---|---|
| CN | 105890048 A | 8/2016 |
| CN | 106091175 A | 11/2016 |
| CN | 107138023 A | 9/2017 |
| CN | 208536011 U | 2/2019 |
| CN | 208983375 U | 6/2019 |
| DE | 20 2006 002 505 U1 | 5/2006 |
| JP | 2005-103378 A | 4/2005 |
| JP | 2008-057953 A | 3/2008 |
| JP | 2011-062645 A | 3/2011 |
| JP | 5509759 B2 | 6/2014 |
| WO | 2019/117732 A1 | 6/2019 |

OTHER PUBLICATIONS

Extended European Search Report dated Aug. 1, 2023, in European Patent Application No. 20853694.6.
Examination Report dated Feb. 6, 2025, in Australian Patent Application No. 2020333386.
Examination Report dated Feb. 26, 2025, in New Zealand Patent Application No. 783861.
International Search Report dated Oct. 16, 2020, in International Application No. PCT/SE2020/050783.
Office Action dated Oct. 30, 2024, in Chinese Patent Application No. 202080058309.
Office Action dated Jan. 25, 2024, in Chinese Patent Application No. 202080058309.X.
Office Action dated Mar. 18, 2024, in Japanese Patent Application No. 2021-577238.
Office Action dated May 13, 2025, in Chinese Patent Application No. 202080058309.X.

\* cited by examiner

VOLATILE ORGANIC COMPOUND REDUCTION APPARATUS

TECHNICAL FIELD

The invention relates to a volatile organic compound (VOC) reduction apparatus and a method, performed by a control device of a VOC reduction apparatus according to the appended claims. The invention also relates to a computer program product and a computer-readable medium according to the appended claims.

BACKGROUND AND PRIOR ART

Systems for manufacturing or other industrial processes often exhaust, as byproducts, particulates and fumes or exhaust vapors that may include gaseous air pollutants such as volatile organic compounds. It is desirable for environmental and health reasons, and to comply with environmental laws, to remove the VOCs before exhausting the fumes to atmosphere.

VOC reduction apparatuses, provided with a rotor element that holds a medium for removal of the VOCs, are used for abatement of VOCs in industrial process gases. Certain known VOC abatement systems utilize a rotor element that holds a medium for removal of the VOCs. One example of such a medium is zeolite. Zeolite is an inorganic crystal with properties suited to adsorbing VOCs. As the rotor element rotates at a controlled speed, VOC-laden process airflow is directed through a defined adsorption zone of the apparatus and leaves as substantially clean air as the zeolite adsorbs and removes a majority of the VOCs from the process airflow. The cleaned air can then be safely discharged to atmosphere. The rotor element continues to rotate and zeolite sections of the rotor element that had adsorbed VOCs are moved to a defined desorption or regeneration zone. In order to remove the VOCs adsorbed by the rotor element, heated regeneration air is directed through the rotor element in the regeneration zone of the VOC reduction apparatus. The removed VOCs are carried in a concentrate airstream away from the rotor for further processing. Thus, the rotor element turns continuously, so that the adsorbed VOCs are moved from the adsorption zone to the regeneration zone where the VOCs are removed from the rotor element, and the regenerated sector of the rotor then returns to the adsorption zone where the process air stream flows in a continuous process through the rotor element. The concentrate airstream of VOCs can be sent to an oxidizer and/or catalyst where the VOCs are converted to residual products, such as water vapor and carbon dioxide ($CO_2$). Such a zeolite rotor element can be incorporated in more complex systems that includes one or more rotor elements and corresponding drive motors as well as various motor-driven fans.

The document US2018154303A1 discloses an apparatus for removing specified substances from a process gaseous stream, which apparatus comprises rotor elements.

SUMMARY OF THE INVENTION

The VOC concentrate airstream that enters the rotor element is typically sent to an oxidizer and/or catalyst to convert the VOCs into residual products, such as non-polluting constituents. The oxidation heat in the oxidizer is generated by combustion in an oxidation chamber, using any known combustion fuel, such as natural gas or diesel fuel. The amount of heat generated for oxidation can be controlled by metering the fuel supply and/or fuel consumption. In the oxidation chamber, oxidation may convert the VOCs into water vapor and $CO_2$. However, the size of fuel consumption for heat generation is dependent on the concentration of VOC in the VOC concentrate airstream. A high degree of concentration of VOC in the VOC concentrate airstream will reduce the consumption of fuel and also the generation of $CO_2$.

Therefore, there is a need to develop a VOC reduction apparatus, which reduce the consumption of fuel when oxidation the VOCs into residual products.

There is also a need to develop a VOC reduction apparatus, which reduce the generation of $CO_2$ when oxidation the VOCs into residual products.

There is also a need to develop a VOC reduction apparatus, which extracts a high degree of concentration of VOCs in an airflow to be processed.

The object of the invention therefore is to develop a VOC reduction apparatus and a method, performed by a control device of a VOC reduction apparatus, which reduce the consumption of fuel when oxidation the VOCs into residual products.

Another object of the invention is also to develop a VOC reduction apparatus and a method, performed by a control device of a VOC reduction apparatus, which reduce the generation of $CO_2$ when oxidation the VOCs into residual products.

A further object of the invention is also to develop a VOC reduction apparatus and a method, performed by a control device of a VOC reduction apparatus, which extracts a high degree of concentration of VOCs in an airflow to be processed.

These objects are achieved with the above-mentioned VOC reduction apparatus and a method, performed by a control device of a VOC reduction apparatus according to the appended claims.

According to the invention a volatile organic compound reduction apparatus for removing volatile organic compounds from air is provided, the apparatus comprising: a first and a second rotor element each provided with a plurality of channels, configured to separate the volatile organic compounds from air by adsorption and desorption the volatile organic compounds to and from the first and a second rotor elements; a first adsorption zone of the apparatus, configured to guide a process airflow through the first rotor element; a first desorption zone of the apparatus, configured to guide a first regenerating airflow through the first rotor element; and a converter configured to convert the volatile organic compounds to residual products; wherein the second rotor element is configured to receive the first regenerating airflow, after passing through the first rotor element, at a second adsorption zone of the apparatus; a second desorption zone of the apparatus is configured to guide a second regenerating airflow through the second rotor element; and the converter is configured to receive the second regenerating airflow as concentrated volatile organic compounds, after the second regenerating airflow has passed the second rotor element, and wherein the first rotor element has a circular configuration with a first diameter and the second rotor element has a circular configuration with a second diameter; and the first diameter is larger than the second diameter.

The removed VOCs, carried in a first regenerating airflow, away from the first rotor element will be further concentrated after passing the second rotor element and leaving the second rotor element as a second regenerating airflow. The first and second rotor elements turn continuously, so that the adsorbed VOCs are moved from the adsorption zone to the regeneration zone where the VOCs are removed from the rotor elements, and the regenerated sector of the rotor then returns to the adsorption zone. The concentrate of VOCs in the second regenerating airflow are sent to the converter where the VOCs are converted by oxidation to residual products, such as water vapor and CO2 in an oxidation converter or where the VOCs are converted to residual products by other means, such as condensing in a cooling converter or sedimentation in a sedimentation converter.

Such VOC reduction apparatus, will extract a high degree of concentration of VOCs in an airflow to be processed. The VOC reduction apparatus will reduce the consumption of fuel when oxidation the VOCs into residual products. In addition, the generation of CO2 when oxidation the VOCs into residual products will be reduced.

According to the invention a method, for removing volatile organic compounds from air, performed by a control device of a volatile organic compound reduction apparatus, by separating the volatile organic compounds from air by adsorption and desorption the volatile organic compounds to and from a first and a second rotor element of the apparatus, is provided. The first and the second rotor elements each are provided with a plurality of channels and wherein the first rotor element has a circular configuration with a first diameter and the second rotor element has a circular configuration with a second diameter; and the first diameter is larger than the second diameter. The method comprising the steps of: generating a process airflow, through the first rotor element at a first adsorption zone of the apparatus; producing a first regenerating airflow, through the first rotor element at a first desorption zone of the apparatus; receiving the first regenerating airflow in the second rotor element, after passing through the first rotor element, at a second adsorption zone of the apparatus; producing a second regenerating airflow through the second rotor element at a second desorption zone of the apparatus; receiving the second regenerating airflow as concentrated volatile organic compounds in a converter, after the second regenerating airflow has passed the second rotor element; and converting the volatile organic compounds to residual products in the converter of the apparatus.

This method will reduce the consumption of fuel when oxidation the VOCs into residual products, such as non-polluting constituents. In addition, the generation of CO2 when oxidation the VOCs into residual products will be reduced by the method. Such method will also extract a high degree of concentration of VOCs in an airflow to be processed.

Additional objectives, advantages and novel features of the invention will be apparent to one skilled in the art from the following details, and through exercising the invention. While the invention is described below, it should be apparent that the invention is not limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which.

DETAILED DESCRIPTION OF THE DRAWINGS

Figure 1:
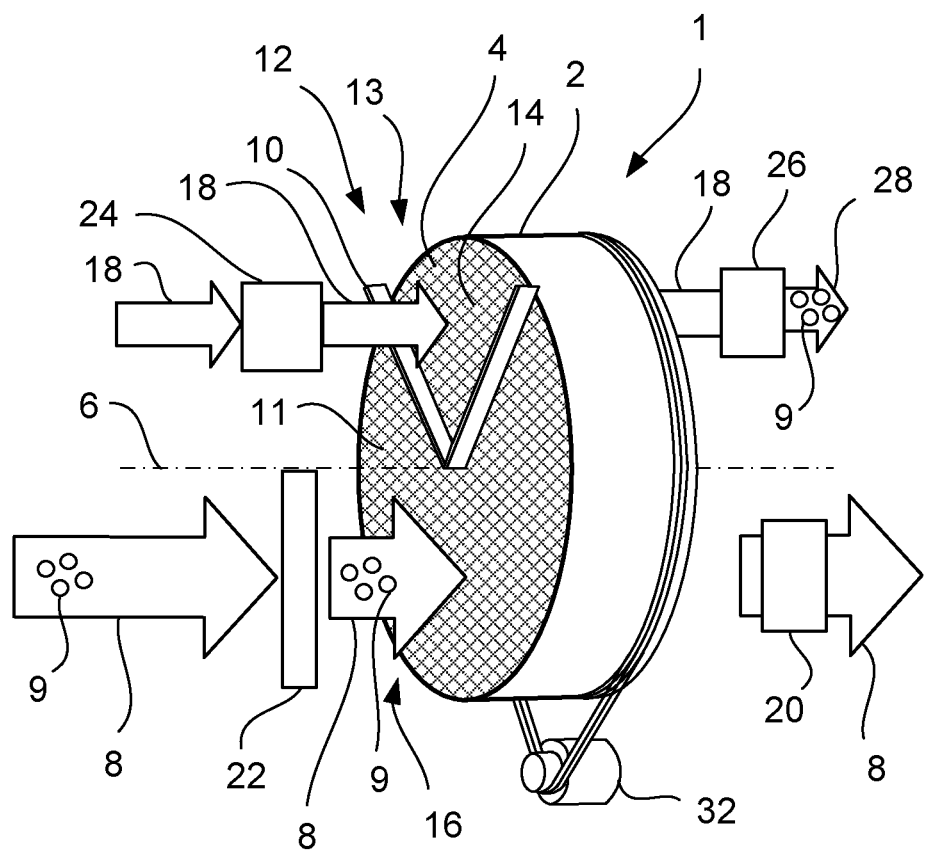
FIG. 1 schematically illustrates the principle of a volatile organic compound reduction apparatus according to an example, FIG. 2 schematically illustrates a volatile organic compound reduction apparatus according to an example.

The volatile organic compound (VOC) reduction apparatus and method according to the present disclosure will reduce the consumption of fuel when oxidation the VOCs into residual products, such as non-polluting constituents. In addition, the generation of carbon dioxide (CO2) when oxidation the VOCs into residual products will be reduced by the apparatus and method. The VOC reduction apparatus and method according to the present disclosure will also extract a high degree of concentration of VOCs in an airflow to be processed.

According to the present disclosure a volatile organic compound reduction apparatus for removing volatile organic compounds from air is provided, the apparatus comprising: a first and a second rotor element each provided with a plurality of channels, configured to separate the volatile organic compounds from air by adsorption and desorption the volatile organic compounds to and from the first and a second rotor elements; a first adsorption zone of the apparatus, configured to guide a process airflow through the first rotor element; a first desorption zone of the apparatus, configured to guide a first regenerating airflow through the first rotor element; and a converter configured to convert the volatile organic compounds to residual products; wherein the second rotor element is configured to receive the first regenerating airflow, after passing through the first rotor element, at a second adsorption zone of the apparatus; a second desorption zone of the apparatus is configured to guide a second regenerating airflow through the second rotor element; and the converter is configured to receive the second regenerating airflow as concentrated volatile organic compounds, after the second regenerating airflow has passed the second rotor element, and wherein the first rotor element has a circular configuration with a first diameter and the second rotor element has a circular configuration with a second diameter; and the first diameter is larger than the second diameter.

The volatile organic compound reduction apparatus is capable to remove VOCs in air, which are emanating from for example manufacturing or other industrial processes. The air comprising VOCs are led into and treated in the VOC reduction apparatus before exhausting the air as treated air to atmosphere comprising substantially no VOCs or only a very small amount of VOCs. The first and the second rotor element are each provided with a plurality of channels, which extend from one side to the other side of each rotor element. The first and the second rotor elements hold a medium for removal of the VOCs. One example of such a medium is zeolite, which adsorbs VOCs. The zeolite medium is arranged on the surface of the channels in the rotors. Alternatively, the entire rotor elements are made of zeolite. Each of the first and the second rotor elements rotates at a controlled speed by means of a drive element, such as an electric driven motor. Each rotor element may be provided with an electric driven motor, so that the first and the second rotor elements can be driven independently from each other and at different rotational speeds. A control device of the apparatus may be connected to the electric driven motors for individually controlling the rotational speeds of the of the first and second rotor elements. The apparatus may alternatively be configured without a control device.

The process airflow comprises VOCs and emanates from, for example, the air in a building in which a manufacturing or other industrial processes takes place. The VOC-laden process airflow is directed through the first adsorption zone of the apparatus and leaves as substantially clean air as the zeolite in the first rotor element adsorbs and removes a majority of the VOCs from the process airflow. The air, that has passed the rotor element, can then be safely discharged to atmosphere as cleaned air. The first rotor element continues to rotate and the sections of the first rotor element that had adsorbed VOCs are moved to the first desorption zone of the apparatus. In order to remove the VOCs adsorbed by the first rotor element, a heated first regeneration airflow is directed through the first rotor element in the first desorption zone of the apparatus. The heated first regeneration airflow removes VOCs from the first rotor element and are carried in a the first regeneration airflow away from the first rotor element and further to the second adsorption zone of the apparatus, which second adsorption zone is situated at the second rotor element. The first regeneration airflow, comprising VOCs, is directed through the second rotor element at the second adsorption zone of the apparatus. The zeolite in the second rotor element adsorbs a substantially amount of VOCs from the first regeneration airflow and removes a substantially amount of the VOCs from the first regeneration airflow.

In order to remove the VOCs adsorbed by the second rotor element, a heated second regeneration airflow is directed through the second rotor element in the second desorption zone of the apparatus. The heated second regeneration airflow removes VOCs from the second rotor element and the removed VOCs are carried in a concentrated form in the second regeneration airflow away from the second rotor element and further to the converter. The converter may be an oxidizer and/or catalyst where the VOCs are converted to residual products, such as water vapor and carbon dioxide ($CO_2$). The oxidation heat in the oxidizer is generated by combustion in an oxidation chamber, using any known combustion fuel, such as natural gas or diesel fuel. The size of the fuel consumption for heat generation is dependent on the concentration of VOCs in the second regeneration airflow. Since there is a high degree of concentration of VOCs in the second regeneration airflow the consumption of fuel and also the generation of $CO_2$ will be reduced. Alternatively, the VOCs are converted to residual products by other means, such as condensing in a cooling converter or sedimentation in a sedimentation converter.

The removed VOCs from the first rotor element are carried in the first regeneration airflow away from the first rotor element and further to the second rotor element. The degree of concentration of VOCs in the first regeneration airflow will increase during the process in the second rotor element. However, when the first diameter $d1$ of the first rotor element is larger than the second diameter $d2$ of the second element, the degree of concentration of VOCs in the second regeneration airflow, when leaving the second rotor element, will be even higher comparing to the situation when the first and second rotor elements have equal diameters. It is possible to configure the second rotor element with a smaller diameter than the diameter of the first rotor element since the volume flow of the first regeneration airflow that passes the second rotor element is smaller than the first process airflow through the first rotor element. Thus, in order to process large airflows for cleaning large volumes of air, the volume of flow of the process airflow through the first rotor element should be large. Since the second rotor element process the first regeneration airflow from the first rotor element, the capacity of handling airflows in the second rotor element may be lower than the capacity of handling airflows in the first rotor element. Therefore, the second rotor element may have a smaller diameter than the first rotor element.

According to an example, the ratio between the first diameter $d1$ and the second diameter $d2$ is in the range 20:1-2:1.

It is possible to configure the second rotor element with a substantially smaller diameter than the diameter of the first rotor element. Thus, the diameter of the first rotor element may be twenty times larger than the diameter of the second rotor element. With such a large difference in rotor diameters of the first and second rotor elements, the volume flow of the first regeneration airflow that passes the second rotor element should be adapted to this smaller size of the second rotor element. Such large difference in rotor diameters of the first and second rotor elements will result in a large degree of concentration of VOCs in the second regeneration airflow, when emerging the second rotor element.

The oxidation heat in the oxidizer, generated by combustion of fuel in the oxidation chamber will result in a reduced fuel consumption for heat generation due to the high concentration of VOCs in the second regeneration airflow. Since there is a high degree of concentration of VOCs in the second regeneration airflow, due to the large difference in rotor diameters of the first and second rotor elements, the consumption of fuel and also the generation of $CO_2$ will be reduced when oxidation heat in the oxidizer is generated by combustion in an oxidation chamber.

According to an example, the ratio between the first diameter $d1$ and the second diameter $d2$ is in the range 15:1-5:1.

When the ratio between the first diameter $d1$ and the second diameter $d2$ is in the range 15:1-5:1, the apparatus may be adapted to handling large volumes of process air. The difference in rotor diameters of the first and second rotor elements within such range, will result in a reduced fuel consumption for heat generation due to a high concentration of VOCs in the second regeneration airflow. The difference in rotor diameters of the first and second rotor elements, corresponding to the range 15:1-5:1, will also reduce the generation of $CO_2$ as a result of low fuel consumption when oxidation heat in the oxidizer is generated by combustion in an oxidation chamber.

According to an example, the ratio between the first diameter $d1$ and the second diameter $d2$ is 10:1.

When the ratio between the first diameter $d1$ and the second diameter $d2$ is 10:1, the apparatus may be optimized for handling large volumes of process air. The difference in rotor diameters of the first and second rotor elements corresponding to 10:1, will result in a reduced fuel consumption for heat generation due to a high concentration of VOCs in the second regeneration airflow. Such difference in rotor diameters of the first and second rotor elements, will also reduce the generation of $CO_2$ as a result of low fuel consumption when oxidation heat in the oxidizer is generated by combustion in an oxidation chamber. Due to a high concentration of VOCs in the second regeneration airflow, VOCs may be effectively converted to residual products by other means, such as condensing in a cooling converter or sedimentation in a sedimentation converter.

According to an example, a process air fan is configured to generate the process airflow through the first rotor element at the first adsorption zone of the apparatus. Such process air fan may be driven by a first fan motor. The rotational speed of the process air fan may be individually controlled. The process air fan may be arranged to push or suck process air through the first rotor element.

According to an example, a regenerating air fan is configured to produce the first regenerating airflow through the first rotor element at the first desorption zone of the apparatus; and wherein the regenerating air fan is configured to produce the second regenerating airflow through the second rotor element at the second desorption zone of the apparatus. Such regenerating air fan may be driven by a second fan motor. The rotational speed of the regenerating air fan may be individually controlled. The regenerating air fan may be arranged to push or suck regenerating air through the first rotor element and/or the second rotor element.

The apparatus may be configured without a process air fan and/or without regenerating air fan. Thus, the process airflow may be generated without the process air fan. The first and second regenerating airflows may be generated without the regenerating air fan. Instead, the process airflow, and the first and second regenerating airflows may be generated by means of pressure differences in and outside of the apparatus.

According to an example, a cooler is configured to receive and cool the first regenerating airflow, after passing through the first rotor element and before the first regenerating airflow enters the second rotor element. The cooler will reduce the temperature of the first regenerating airflow. The first regenerating airflow is heated before entering the first rotor element. The the first regenerating airflow is guided to the second process zone of the apparatus, for further guidance to the second rotor element. In order to achieve an effective adsorption of VOCs on the surface of the channels in the second rotor element, the temperature of the first regenerating airflow should be in a predetermined temperature range. The temperature range for the first regenerating airflow when leaving the cooler may be 10°-70° Celsius. Thus, the cooler will reduce the temperature of the first regenerating airflow before the first regenerating airflow enters the second rotor element. The guidance of airflow in the apparatus may be performed by ducts, channels and/or pipes or similar guiding elements.

According to an example, volatile organic compounds, which are condensed from the first regenerating airflow in the heat exchanger are configured to be guided to the converter. The first regenerating airflow may contain vapour. Reducing the temperature of the first regenerating airflow in the cooler may result in condensed VOCs in the cooler. The condensed VOCs are configured to be guided to the converter and together with the VOCs in the second regeneration airflow be converted to residual products.

According to an example, a heat exchanger is configured to receive the first regenerating airflow, after passing through the first rotor element and before the first regenerating airflow enters the second rotor element; and wherein the heat exchanger is configured to receive ambient air to be heated by the first regenerating airflow in the heat exchanger.

The heat exchanger is configured to heat ambient air that enters the heat exchanger, but also to reduce the temperature of the first regenerating airflow. Since the first regenerating airflow is used to heat the ambient air, the temperature of the first regenerating airflow will be reduced. The first regenerating airflow is heated before entering the first rotor element. The the first regenerating airflow is guided to the second process zone of the apparatus, for further guidance to the second rotor element. In order to achieve an effective adsorption of VOCs on the surface of the channels in the second rotor element, the temperature of the first regenerating airflow should be in a predetermined temperature range. The temperature range for the first regenerating airflow when leaving the heat exchanger may be 10°-70° Celsius. Thus, the heat exchanger will reduce the temperature of the first regenerating airflow before the first regenerating airflow enters the second rotor element. The guidance of airflow in the apparatus may be performed by ducts, channels and/or pipes or similar guiding elements. The apparatus may be provided with a cooler and/or a heat exchanger.

According to an example, the regenerating air fan is configured to feed the heated ambient air from the heat exchanger and to produce the first regenerating airflow.

The ambient air, which is heated by the first regenerating airflow in the heat exchanger is used as first regenerating airflow in the first rotor element. Thus, the regenerating air fan feeds the heated ambient air from the heat exchanger to the first regeneration zone of the apparatus.

According to an example, the regenerating air fan is configured to feed the heated ambient air from the heat exchanger and to produce the second regenerating airflow.

The ambient air, which is heated by the first regenerating airflow in the heat exchanger may be used as second regenerating airflow in the second rotor element. Thus, the regenerating air fan feeds the heated ambient air from the heat exchanger to the second regeneration zone of the apparatus.

According to an example, volatile organic compounds, which are condensed from the first regenerating airflow in the heat exchanger are configured to be guided to the converter.

The first regenerating airflow may contain vapour. Reducing the temperature of the first regenerating airflow in the heat exchanger may result in condensed VOCs in the heat exchanger. The condensed VOCs are configured to be guided to the converter and together with the VOCs in the second regeneration airflow be converted to residual products.

According to an example, the first regenerating airflow, after passing through the second rotor element, is configured to enter the process airflow of the first rotor element at the first adsorption zone of the apparatus.

The zeolite in the second rotor element adsorbs a substantially amount of VOCs from the first regeneration airflow and removes a substantially amount of the VOCs from the first regeneration airflow. However, the first regeneration airflow that leaves the second rotor element may comprise VOCs due to the concentration of VOCs in the first regeneration airflow before the first regeneration airflow enters the second rotor element. Therefore, the first regeneration airflow that leaves the second rotor element is returned to the process airflow at the first adsorption zone of the apparatus.

According to an example, a control device configured for controlling the apparatus. The control device may be a part of the apparatus, or be an external control device. The control device may be configured to control a number of different apparatuses.

According to the present disclosure, a method, for removing volatile organic compounds from air, performed by a volatile organic compound reduction apparatus, by separating the volatile organic compounds from air by adsorption and desorption the volatile organic compounds to and from a first and a second rotor element of the apparatus, is provided. The first and the second rotor elements each are provided with a plurality of channels and wherein the first rotor element has a circular configuration with a first diameter and the second rotor element has a circular configuration with a second diameter; and the first diameter is larger than the second diameter. The method comprising the steps of: generating a process airflow through the first rotor element at a first adsorption zone of the apparatus; producing a first regenerating airflow through the first rotor element at a first desorption zone of the apparatus; receiving the first regenerating airflow in the second rotor element, after passing through the first rotor element, at a second adsorption zone of the apparatus; producing a second regenerating airflow through the second rotor element at a second desorption zone of the apparatus; receiving the second regenerating airflow as concentrated volatile organic compounds in a converter, after the second regenerating airflow has passed the second rotor element; and converting the volatile organic compounds to residual products in the converter of the apparatus.

Removing VOCs in air, which are emanating from for example manufacturing or other industrial processes may be performed in the volatile organic compound reduction apparatus described above, by separating the VOCs from air by adsorption and desorption the VOCs to and from a first and a second rotor element of the apparatus. The air comprising VOCs are led or guided into and treated in the VOC reduction apparatus before exhausting the air as treated air to atmosphere comprising substantially no VOCs or only a very small amount of VOCs. The first and the second rotor element are each provided with a plurality of channels, which extend from one side to the other side of each rotor element. Generating the process airflow may be performed by means of the process air fan of the apparatus. The process airflow is guided through the first rotor element at a first adsorption zone of the apparatus. The process air fan may be an electric motor driven fan, which sucks the process air through the first rotor element. Producing the first regenerating airflow may be performed by means of the regenerating air fan of the apparatus, through the first rotor element at a first desorption zone of the apparatus. The regenerating air fan may be an electric motor driven fan, which forces the process air through the first rotor element by means of a positive pressure. Receiving the first regenerating airflow in the second rotor element, after passing through the first rotor element, at the second adsorption zone of the apparatus, is performed by guiding the first regenerating airflow to the second adsorption zone at the second rotor element. Such guidance of the first regenerating airflow may be performed by ducts, channels and/or pipes or similar of the apparatus. Producing a second regenerating airflow by the regenerating air fan through the second rotor element at the second desorption zone of the apparatus may be performed by guiding the second regenerating airflow to the second desorption zone at the second rotor element. Receiving the second regenerating airflow as concentrated VOCs in the converter, after the second regenerating airflow has passed the second rotor element may be performed by the adsorption of VOCs from the surface of the channels in the second rotor element. Converting the VOCs to residual products in the converter of the apparatus may be performed in an oxidizer and/or catalyst where the VOCs are converted to residual products, such as water vapor and carbon dioxide ($CO_2$). The oxidation heat in the oxidizer is generated by combustion in an oxidation chamber, using any known combustion fuel, such as natural gas or diesel fuel. The size of the fuel consumption for heat generation is dependent on the concentration of VOCs in the second regeneration airflow. Since there is a high degree of concentration of VOCs in the second regeneration airflow the consumption of fuel and also the generation of $CO_2$ will be reduced when oxidation heat in the oxidizer generated by combustion in an oxidation chamber. Due to a high concentration of VOCs in the second regeneration airflow, VOCs may be effectively converted to residual products by other means, such as condensing in a cooling converter or sedimentation in a sedimentation converter.

According to an example, the method comprising the further step of: receiving and cooling the first regenerating airflow in a cooler, after passing through the first rotor element and before the second rotor element receiving the first regenerating airflow.

The cooler is configured to reduce the temperature of the first regenerating airflow. Since the first regenerating airflow is used to heat the ambient air, the temperature of the first regenerating airflow will be reduced. The first regenerating airflow is heated before entering the first rotor element. The the first regenerating airflow is guided to the second process zone of the apparatus, for further guidance to the second rotor element. In order to achieve an effective adsorption of VOCs on the surface of the channels in the second rotor element, the temperature of the first regenerating airflow should be in a predetermined temperature range. The temperature range for the first regenerating airflow when leaving the cooler may be 10°-70° Celsius. Thus, the cooler will reduce the temperature of the first regenerating airflow before the first regenerating airflow enters the second rotor element. The guidance of airflow in the apparatus may be performed by ducts, channels and/or pipes or similar guiding elements.

According to an example, the method comprising the further steps of: receiving the first regenerating airflow in a heat exchanger of the apparatus, after passing through the first rotor element and before the second rotor element receiving the first regenerating airflow; receiving ambient air in the heat exchanger to be heated by the first regenerating airflow in the heat exchanger; and feeding the heated ambient air from the heat exchanger by the regenerating air fan.

The heat exchanger is configured to heat ambient air that enters the heat exchanger, but also to reduce the temperature of the first regenerating airflow. Since the first regenerating airflow is used to heat the ambient air, the temperature of the first regenerating airflow will be reduced. The first regenerating airflow is heated before entering the first rotor element. The the first regenerating airflow is guided to the second process zone of the apparatus, for further guidance to the second rotor element. In order to achieve an effective adsorption of VOCs on the surface of the channels in the second rotor element, the temperature of the first regenerating airflow should be in a predetermined temperature range. The temperature range for the first regenerating airflow when leaving the heat exchanger may be 10°-70° Celsius. Thus, the heat exchanger will reduce the temperature of the first regenerating airflow before the first regenerating airflow enters the second rotor element. The guidance of airflow in the apparatus may be performed by ducts, channels and/or pipes or similar guiding elements.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above.

The present disclosure will now be further illustrated with reference to the appended figures.

Figure 2:
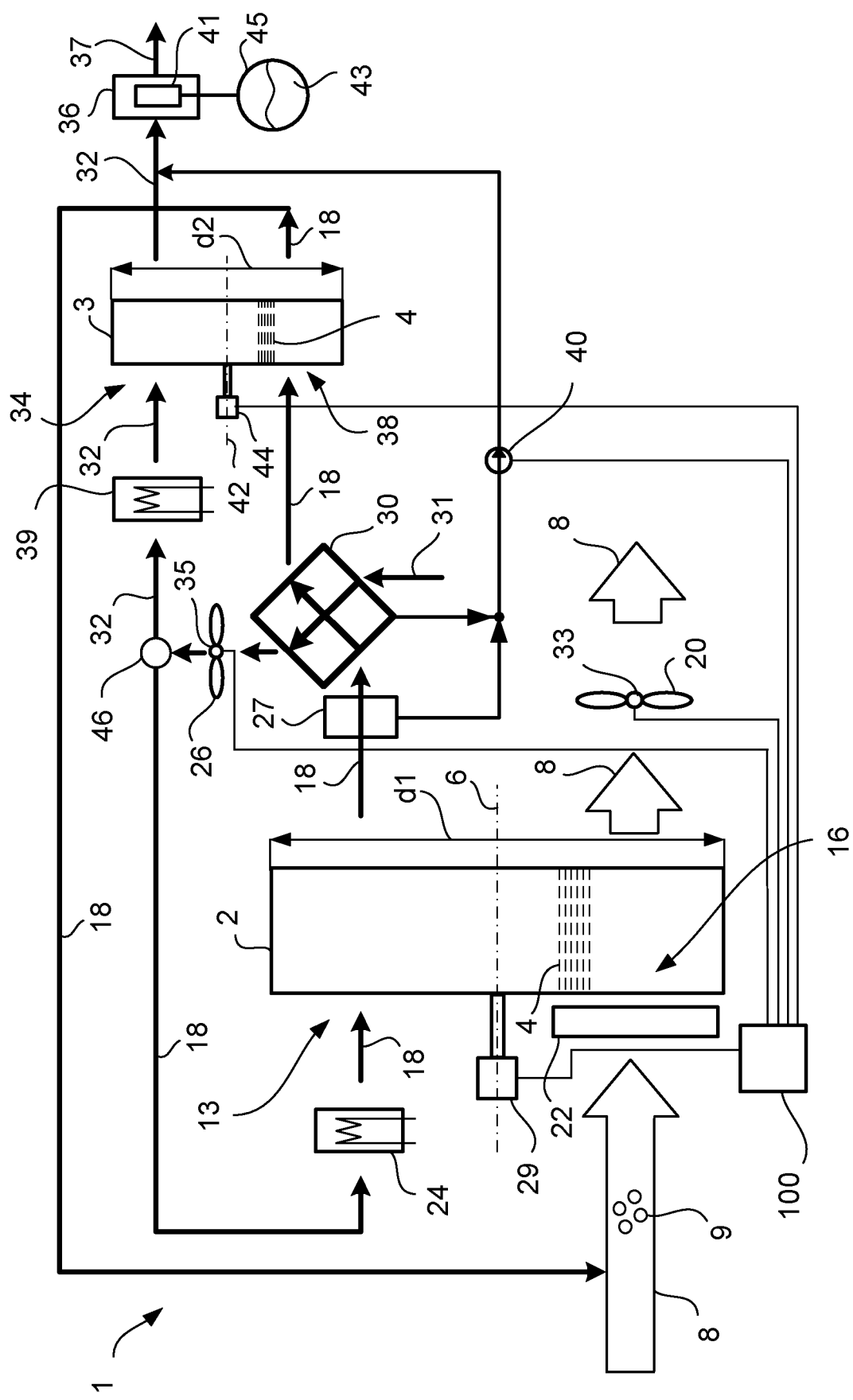

FIG. 1 schematically illustrates the principle of a first rotor element 2 of a volatile organic compound (VOC) reduction apparatus 1 according to an example. The VOC reduction apparatus 1 according to the present disclosure comprises two rotor elements, the first rotor element 2 and a second rotor element 3 (FIG. 2). However, in order to describe the function of the rotor element, only the first rotor element 2 is disclosed in FIG. 1. A number of channels 4 are arranged in the first rotor element 2. The channels 4 may extend from one side to the other of the first rotor element 2. The channels 4 are parallel to the first center axis 6 of the first rotor element 2. A process airflow 8 may pass the channels 4. The first rotor element 2 is adapted to treat the process airflow 8 by reducing VOCs 9 in the process airflow 8 that may pass through the channels 4 of the first rotor element 2. The first rotor element 2 holds a medium 11 for removal of the VOCs 9. One example of such a medium 11 is zeolite. The zeolite adsorbs and removes a majority of the VOCs 9 from the process airflow 8. A generally V-shaped, partition member 10 segregates a pie-shaped portion 12 of the first rotor element 2 from the remaining portion thereof to define a first desorption zone 13 of the apparatus 1 and thus a first regenerating section 14 of the first rotor element 2. The remaining portion of the first rotor element 2 is situated in a first adsorption zone 16 of the apparatus 1. The first desorption zone 13 of the apparatus 1 may occupy about one quarter to one third of the surface area of the first rotor element 2. The process airflow 8 to be treated is allowed to flow through the channels 4 in the first rotor element 2. A heated first regenerating airflow 18 is, at the same time, allowed to pass through the first desorption zone 13 of the apparatus and thus the first regenerating section 14 of the first rotor element 2. The first regenerating airflow 18, increases the temperature of the first rotor element 2, so that the first rotor element 2 releases the VOCs 9 which is then carried away by the first regenerating airflow 18 and further to the second rotor element (FIG. 2). The portion of the first rotor element 2 that has released VOCs 9 to the first regenerating airflow 18 is rotated into the first adsorption zone 16 of the apparatus 1, where it once again absorbs VOCs 9 from the process airflow 8. A process air fan 20 is configured for drawing the process airflow 8 from air that emanates from manufacturing or other industrial processes, which air containing VOCs 9, and urging the process airflow 8 to flow through a filter element 22 and the first adsorption zone 16 of the first rotor element 2 in order to remove VOCs 9 from the process airflow 8. Downstream of the first adsorption zone 16 of the apparatus 1 the cleaned process airflow 8 is exhausted into the atmosphere. The reactivation airflow 18 is drawn from the atmosphere and heated in a first heater element 24. A regenerating air fan 26 may be arranged for drawing the reactivation air from atmosphere and urging it to flow through the first regenerating section 14 of the first rotor element 2 in order to cause the VOCs 9 trapped in the first regenerating section 14 to be released therefrom into the first regenerating airflow 18. A first regenerating air outlet 26 is located downstream of the first desorption zone 13 of the apparatus 1 for exhausting the first regenerating airflow 18 to the second rotor element (FIG. 2). A first rotor motor 29 is configured to rotate the first rotor element 2 about the first center axis 6.

FIG. 2 schematically illustrates a VOC reduction apparatus 1 for removing VOCs 9 from air. The first and second rotor elements 2, 3 are each provided with a plurality of channels 4, configured to separate the VOCs 9 from air by adsorption and desorption the VOCs 9 to and from the first and second rotor elements 2, 3. The process air fan 20 is driven by a first fan motor 33 and the process air fan 20 is configured to generate a process airflow 8 through the first rotor element 2 at the first adsorption zone 16 of the apparatus 1. The regenerating air fan 26 is configured to produce the first regenerating airflow 18 through the first rotor element 2 at the first desorption zone 13 of the apparatus 1. The regenerating air fan 26 is driven by a second fan motor 35. A cooler 27 is configured to reduce the temperature of the first regenerating airflow 18 before the first regenerating airflow 18 enters the second rotor element 3. A heat exchanger 30 is configured to receive the first regenerating airflow 18, after passing through the first rotor element 2 and after passing through the cooler 27. After passing the heat exchanger 30, the first regenerating airflow 18 enters the second rotor element 3. The heat exchanger 30 is configured to receive ambient air 31 to be heated by the first regenerating airflow 18 in the heat exchanger 30.The regenerating air fan 26 is configured to feed the heated ambient air 31 from the heat exchanger 30 and to produce the first regenerating airflow 18. The first reactivation airflow 18 is heated in the first heater element 24 before entering the first desorption zone 13 of the apparatus 1. The regenerating air fan 26 is also configured to feed the heated ambient air 31 from the heat exchanger 30 and to produce a second regenerating airflow 32 through the second rotor element 3 at a second desorption zone 34 of the apparatus 1. Before the second regenerating airflow 32 enters the second desorption zone 34 of the apparatus 1, the second regenerating airflow 32 is heated by a second heater element 39. A regulator element 46 is configured to distribute the heated ambient air 31 from the heat exchanger 30 to the first and second regenerating airflow 18, 32. A converter 36 is configured to convert the VOCs 9 to residual products 37, such as water vapor and CO2. The converter 36 comprises an oxidation chamber 41 wherein heat for convert the VOCs 9 to residual products 37 is generated by combustion using fuel 43 conveyed to the oxidation chamber 41 from a fuel tank 45. The second rotor element 3 is configured to receive the first regenerating airflow 18, after passing through the first rotor element 2, at a second adsorption zone 38 of the apparatus 1. The first regenerating airflow 18, after passing through the second rotor element 2, is configured to enter the process airflow 8 of the first rotor element 2 at the first adsorption zone 16 of the apparatus 1. The converter 36 is configured to receive the second regenerating airflow 32 as concentrated VOCs 9, after the second regenerating airflow 32 has passed the second rotor element 3. The first rotor element 2 has a circular configuration with a first diameter d1 and the second rotor element 3 has a circular configuration with a second diameter d2. The first diameter d1 is larger than the second diameter d2. The first rotor element 2 is configured to rotate about the first center axis 6 by means of the first rotor motor 29. The second rotor element 3 is configured to rotate about a second center axis 42 by means of a second rotor motor 44. VOCs 9, which are condensed from the first regenerating airflow 18 in the heat exchanger 30 are configured to be guided to the converter 36 by means of a pump 40. VOCs 9, which are condensed from the first regenerating airflow 18 in the cooler 27 are configured to be guided to the converter 36 by means of the pump 40.The guidance of airflow in the apparatus 1 may be performed by ducts, channels and/or pipes or similar guiding elements (not shown). The apparatus 1 may be provided with a cooler 27 and/or a heat exchanger 30.

A control device 100 is configured for controlling the apparatus 1. The control unit 100 is connected to the first and second rotor motors 29, 44, the first and second fan motors 33, 35, and the pump 40. The control unit 100 may also be connected to the first and second heater elements 24, 39. The control unit 100 may also be connected to the converter 36.

Figure 3:
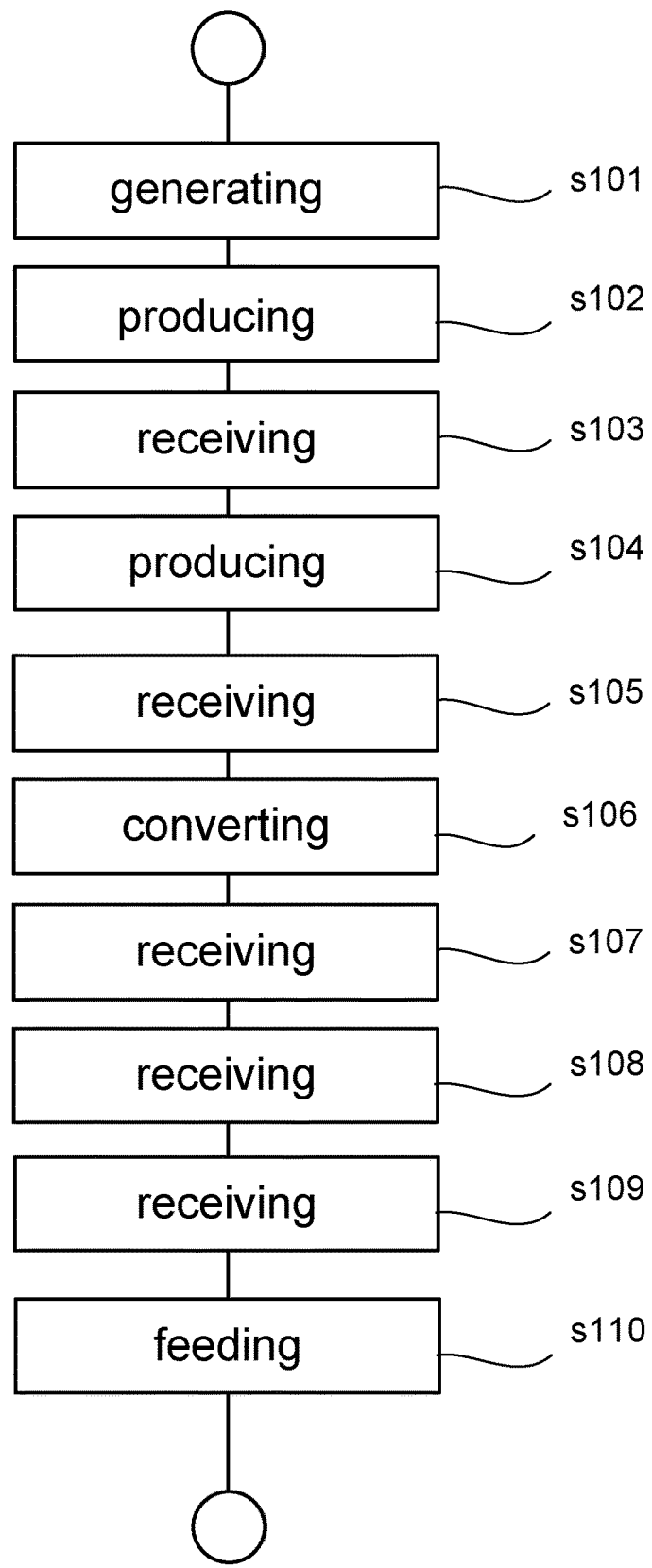
FIG. 3 shows a flow chart for a method, performed by a control device of a volatile organic compound reduction apparatus according to an example, and FIG. 4 schematically illustrates a control unit or computer according to an example.

FIG. 3 shows a flow chart for a method for removing VOCs 9 from air, performed by a control device 100 of a VOC reduction apparatus 1, by separating the VOCs 9 from air by adsorption and desorption the VOCs 9 to and from a first and a second rotor element 2, 3 of the apparatus 1. The first and the second rotor elements 2, 3 each are provided with a plurality of channels 4. The first rotor element 2 has a circular configuration with a first diameter d1 and the second rotor element 3 has a circular configuration with a second diameter d2; and the first diameter d1 is larger than the second diameter d2. The method thus relates to the VOC reduction apparatus 1 disclosed in FIG. 2.

The method comprising the following steps. Generating s101 a process airflow 8, by means of a process air fan 20 of the apparatus 1, through the first rotor element 2 at a first adsorption zone 16 of the apparatus 1. Producing s102 a first regenerating airflow 18, by means of a regenerating air fan 26 of the apparatus 1, through the first rotor element 2 at a first desorption zone 13 of the apparatus 1. Receiving s103 the first regenerating airflow 18 in the second rotor element 3, after passing through the first rotor element 2, at a second adsorption zone 38 of the apparatus 1. Producing s104 a second regenerating airflow 32 by the regenerating air fan 26 through the second rotor element 3 at a second desorption zone 34 of the apparatus 1. Receiving s105 the second regenerating airflow 32 as concentrated volatile organic compounds 9 in a converter 36 of the apparatus 1, after the second regenerating airflow 32 has passed the second rotor element 3. Converting s106 the volatile organic compounds 9 to residual products in the converter 36 of the apparatus 1.

The method comprises the further step: receiving and cooling s107 the first regenerating airflow 18 in a cooler 27, after passing through the first rotor element 2 and before the second rotor element 3 receiving the first regenerating airflow 18.

The method comprises the further steps. Receiving s108 the first regenerating airflow 18 in a heat exchanger 30 of the apparatus 1, after passing through the first rotor element 2 and before the second rotor element 3 receiving the first regenerating airflow 18. Receiving s109 ambient air 31 in the heat exchanger 30 to be heated by the first regenerating airflow 18 in the heat exchanger 30. Feeding s110 the heated ambient air 31 from the heat exchanger 30 by the regenerating air fan 26.

Figure 4:
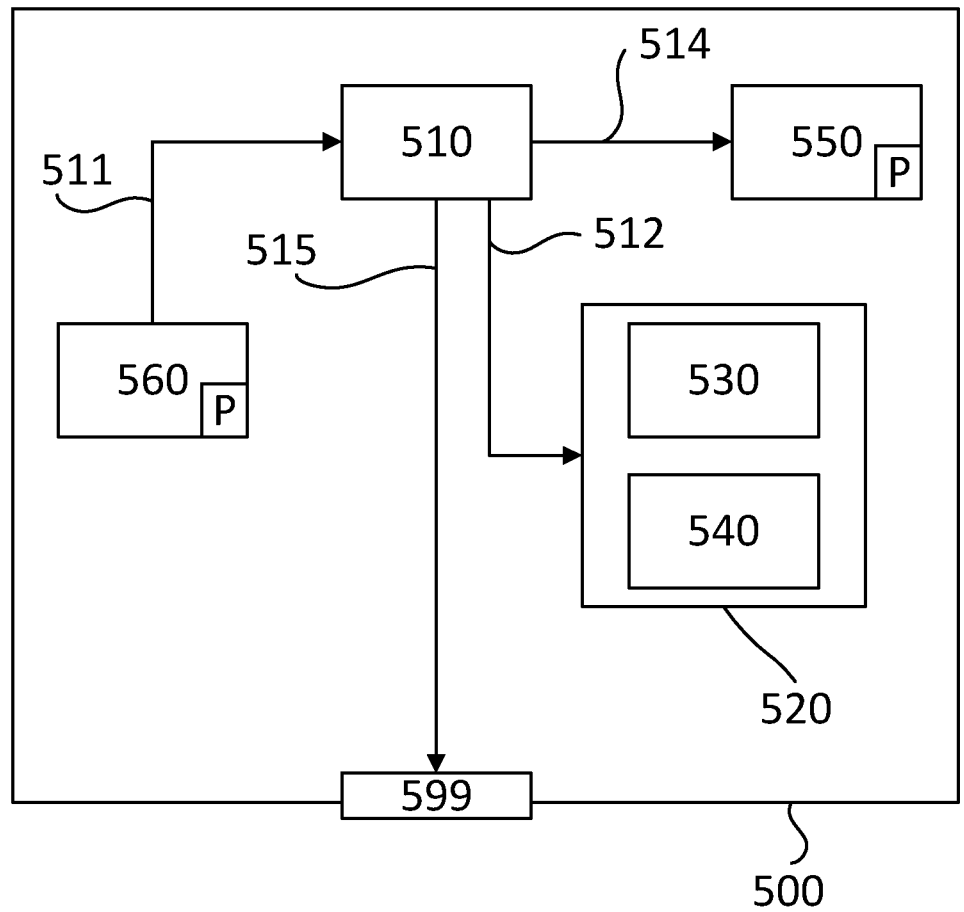

FIG. 4 schematically illustrates a computer or a device 500 according to an example. The control device 100 of the particle protection device 32 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for performing the safety method. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The foregoing description of the examples has been furnished for illustrative and descriptive purposes. It is not intended to be exhaustive, or to limit the examples to the variants described. Many modifications and variations will obviously be apparent to one skilled in the art. The examples have been chosen and described in order to best explicate principles and practical applications, and to thereby enable one skilled in the art to understand the examples in terms of its various examples and with the various modifications that are applicable to its intended use. The components and features specified above may, within the framework of the examples, be combined between different examples specified.

The invention claimed is:

1. A volatile organic compound reduction apparatus for removing volatile organic compounds from air, the apparatus comprising:
    a first and a second rotor element each provided with a plurality of channels, configured to separate the volatile organic compounds from air by adsorption and desorption of the volatile organic compounds to and from the first and second rotor elements;
    a first adsorption zone of the apparatus, configured to guide a process airflow through the first rotor element;
    a first desorption zone of the apparatus, configured to guide a first regenerating airflow through the first rotor element; and
    a converter configured to convert the volatile organic compounds to residual products; wherein
    the second rotor element is configured to receive the first regenerating airflow, after passing through the first rotor element, at a second adsorption zone of the apparatus;
    a second desorption zone of the apparatus is configured to guide a second regenerating airflow through the second rotor element; and
    the converter is configured to receive the second regenerating airflow as concentrated volatile organic compounds, after the second regenerating airflow has passed through the second rotor element;

wherein the first rotor element has a circular configuration with a first diameter (d1) and the second rotor element has a circular configuration with a second diameter (d2);

wherein a volume flow of the first regeneration airflow that passes through the second rotor element is configured to be less than that of the process airflow through the first rotor element; and wherein the first diameter (d1) is larger than the second diameter (d2).

2. The apparatus according to claim 1, wherein the ratio between the first diameter (d1) and the second diameter (d2) is in the range 20:1-2:1.

3. The apparatus according to claim 1, wherein the ratio between the first diameter (d1) and the second diameter (d2) is in the range 15:1-5:1.

4. The apparatus according to claim 1, wherein the ratio between the first diameter (d1) and the second diameter (d2) is 10:1.

5. The apparatus according to claim 1, wherein a process air fan is configured to generate the process airflow through the first rotor element at the first adsorption zone of the apparatus.

6. The apparatus according to claim 1, wherein a regenerating air fan is configured to produce the first regenerating airflow through the first rotor element at the first desorption zone of the apparatus; and wherein the regenerating air fan is configured to produce the second regenerating airflow through the second rotor element at the second desorption zone of the apparatus.

7. The apparatus according to claim 1, wherein a cooler is configured to receive and cool the first regenerating airflow, after passing through the first rotor element and before the first regenerating airflow enters the second rotor element.

8. The apparatus according to claim 1, wherein a heat exchanger is configured to receive and cool the first regenerating airflow, after passing through the first rotor element and before the first regenerating airflow enters the second rotor element; and wherein the heat exchanger is configured to receive ambient air to be heated by the first regenerating airflow in the heat exchanger.

9. The apparatus according to claim 8, wherein volatile organic compounds, which are condensed from the first regenerating airflow in the heat exchanger, are configured to be guided to the converter.

10. The apparatus according to claim 8, wherein a regenerating air fan is configured to produce the first regenerating airflow through the first rotor element at the first desorption zone of the apparatus, and the regenerating air fan is configured to feed the heated ambient air from the heat exchanger and to produce the first regenerating airflow.

11. The apparatus according to claim 8, wherein a regenerating air fan is configured to produce the second regenerating airflow through the second rotor element at the second desorption zone of the apparatus, and the regenerating air fan is configured to feed the heated ambient air from the heat exchanger and to produce the second regenerating airflow.

12. The apparatus according to claim 8, wherein volatile organic compounds, which are condensed from the first regenerating airflow in the heat exchanger, are configured to be guided to the converter.

13. The apparatus according to claim 1, wherein the first regenerating airflow, after passing through the second rotor element, is configured to enter the process airflow of the first rotor element at the first adsorption zone of the apparatus.

14. The apparatus according to claim 1, further comprising a control device configured for controlling the apparatus.

15. A method for removing volatile organic compounds from air, performed by a volatile organic compound reduction apparatus, by separating the volatile organic compounds from air by adsorption and desorption of the volatile organic compounds to and from a first and a second rotor element of the apparatus, wherein the first and the second rotor elements each are provided with a plurality of channels and wherein the first rotor element has a circular configuration with a first diameter (d1) and the second rotor element has a circular configuration with a second diameter (d2); and the first diameter (d1) is larger than the second diameter (d2); the method comprising the steps of:

generating a process airflow through the first rotor element at a first adsorption zone of the apparatus;

producing a first regenerating airflow through the first rotor element at a first desorption zone of the apparatus;

receiving the first regenerating airflow in the second rotor element, after passing through the first rotor element, at a second adsorption zone of the apparatus, wherein a volume of flow of the first regeneration airflow that passes through the second rotor element is configured to be less than that of the process airflow through the first rotor element;

producing a second regenerating airflow through the second rotor element at a second desorption zone of the apparatus;

receiving the second regenerating airflow as concentrated volatile organic compounds in a converter of the apparatus, after the second regenerating airflow has passed through the second rotor element; and converting the volatile organic compounds to residual products in the converter of the apparatus.

16. The method according to claim 15, wherein the method comprises the further step of:

receiving and cooling the first regenerating airflow in a cooler, after passing through the first rotor element and before the second rotor element receives the first regenerating airflow.

17. The method according to claim 15, wherein the method comprises the further steps of:

receiving the first regenerating airflow in a heat exchanger of the apparatus, after passing through the first rotor element and before the second rotor element receives the first regenerating airflow;

receiving ambient air in the heat exchanger to be heated by the first regenerating airflow in the heat exchanger; and feeding the heated ambient air from the heat exchanger by a regenerating air fan.

18. A computer-readable medium comprising instructions, which when executed by a computer, cause the computer to carry out the method according to claim 15.

* * * * *